US012782667B2

(12) United States Patent
Matzinger et al.

(10) Patent No.: US 12,782,667 B2
(45) Date of Patent: Nov. 3, 2026

(54) ELECTRONIC DEVICES WITH MOVABLE OPTICAL ASSEMBLIES

(71) Applicant: Apple Inc., Cupertino, CA (US)

(72) Inventors: Thomas R Matzinger, Half Moon Bay, CA (US); Ivan S Maric, Campbell, CA (US); Guilhem S Azzano, Santa Clara, CA (US); Aidan N Zimmerman, Poway, CA (US); Kristina A Babiarz, San Jose, CA (US); Bijeta Chakraborty, San Jose, CA (US); Alexander B von Schulmann, Sunnyvale, CA (US); Matin Seadat Beheshti, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 417 days.

(21) Appl. No.: 18/328,082

(22) Filed: Jun. 2, 2023

(65) Prior Publication Data

US 2024/0192462 A1 Jun. 13, 2024

Related U.S. Application Data

(60) Provisional application No. 63/431,395, filed on Dec. 9, 2022.

(51) Int. Cl.
*A61B 3/02* (2006.01)
*G02B 7/02* (2021.01)
(Continued)

(52) U.S. Cl.
CPC ......... *G02B 7/023* (2013.01); *G02B 27/0093* (2013.01); *H02K 49/108* (2013.01)

(58) Field of Classification Search
CPC .......... G02B 27/0093; G02B 2027/014; G02B 2027/0149; G02B 27/0101;
(Continued)

(56) References Cited

U.S. PATENT DOCUMENTS 4,537,480 A * 8/1985 Akaba .................. A61B 3/0285 351/235
5,583,693 A * 12/1996 Funatsu ................. G02B 23/18 359/410
(Continued)

FOREIGN PATENT DOCUMENTS

CN 112859350 A * 5/2021 ......... G02B 27/0176
KR 20210128922 A 10/2021
WO 2018158347 A1 9/2018

OTHER PUBLICATIONS

CN112859350 Translation (Year: 2021).*

*Primary Examiner* — Dawayne Pinkney

(74) *Attorney, Agent, or Firm* — Treyz Law Group, P.C.; David K. Cole

(57) ABSTRACT

A head-mounted device may include optical assemblies for presenting images to a user. Motors may be used to adjust the spacing between the optical assemblies to accommodate different interpupillary distances. The force with which the motors move the optical assemblies towards a central nose bride portion of the device may be limited. The force may be limited using a clutch such as a magnetic clutch or a physical clutch based on structures that decouple from each other to limit the force. The force may also be limited by monitoring the force and halting the motors in response to detection of a given amount of force. Sensor measurements and electrical motor load measurement may be used in measuring the force. If desired, motor operation may be controlled by a user-operated button.

20 Claims, 9 Drawing Sheets

(51) Int. Cl.
*G02B 27/00* (2006.01)
*H02K 49/10* (2006.01)

(58) Field of Classification Search
CPC ....... G02B 27/1006; A61B 3/02; A61B 3/102; A61B 3/1025; A61B 3/113; A61B 3/1015; A61B 3/0075; A61H 5/00; G02F 3/011
USPC ........ 359/814, 811, 813, 823, 824, 630–636, 359/462, 466, 404, 407; 345/7, 9, 156; 351/41, 159.75, 200, 205, 206, 208–210, 351/222
See application file for complete search history.

(56) References Cited

U.S. PATENT DOCUMENTS

| | | | | |
|---|---|---|---|---|
| 6,480,174 | B1 | 11/2002 | Kaufmann et al. | |
| 9,025,252 | B2 | 5/2015 | Lewis et al. | |
| 10,453,210 | B2 | 10/2019 | Hwang et al. | |
| 10,567,745 | B2 | 2/2020 | Patel | |
| 10,701,350 | B1 | 6/2020 | Ebert | |
| 11,442,280 | B2 | 9/2022 | McCracken et al. | |
| 2003/0063209 | A1* | 4/2003 | Enomoto | G02B 23/18 348/E5.025 |
| 2013/0083009 | A1 | 4/2013 | Geisner et al. | |
| 2013/0293577 | A1 | 11/2013 | Perez et al. | |
| 2019/0129181 | A1 | 5/2019 | Polcak et al. | |
| 2020/0026079 | A1 | 1/2020 | Franklin et al. | |
| 2020/0064635 | A1 | 2/2020 | Franklin et al. | |
| 2021/0080746 | A1* | 3/2021 | Mirabella | G02B 27/0172 |
| 2021/0088784 | A1* | 3/2021 | Whitmire | G02B 27/0101 |
| 2021/0132397 | A1 | 5/2021 | Stellman et al. | |
| 2021/0333506 | A1 | 10/2021 | Maric et al. | |
| 2022/0099910 | A1* | 3/2022 | Chang | G06F 1/163 |

* cited by examiner

ELECTRONIC DEVICES WITH MOVABLE OPTICAL ASSEMBLIES

This application claims the benefit of provisional patent application No. 63/431,395, filed Dec. 9, 2022, which is hereby incorporated by reference herein in its entirety.

FIELD

This relates generally to electronic devices, and, more particularly, to electronic devices such as head-mounted devices.

BACKGROUND

Electronic devices have components such as displays and lenses. It can be challenging to customize such devices for different users.

SUMMARY

A head-mounted device may include optical assemblies for presenting images to a user. Each optical assembly may have a display and a lens through which an image from the display may be presented to a respective eye box.

Motors may be used to adjust the spacing between the optical assemblies to accommodate different user interpupillary distances. Gaze trackers may be used to measure the eyes of a user to determine target positions for the optical assemblies.

The force with which the motors move the optical assemblies towards a central nose bridge portion of the device and therefore towards nose surfaces located at the nose bridge portion may be limited. The force may be limited using a clutch such as a magnetic clutch or a physical clutch based on structures that decouple from each other to limit the force. The force may also be limited by monitoring the force and halting the motors in response to detection of a given amount of force. Sensor measurements and electrical motor load measurements may be used in measuring the force. If desired, motor operation may be controlled by a user-operated button. The direction of permitted optical assembly movement when accommodating different interpupillary distances may also be controlled.

DETAILED DESCRIPTION

Electronic devices such as head-mounted devices may have displays for displaying images and lenses that are used in presenting the images to eye boxes for viewing by a user. Different users have different spacings between their eyes, which are sometimes referred to as interpupillary distances. To accommodate users with different interpupillary distances, a head-mounted device may be provided with movable optical assemblies.

Figure 1:
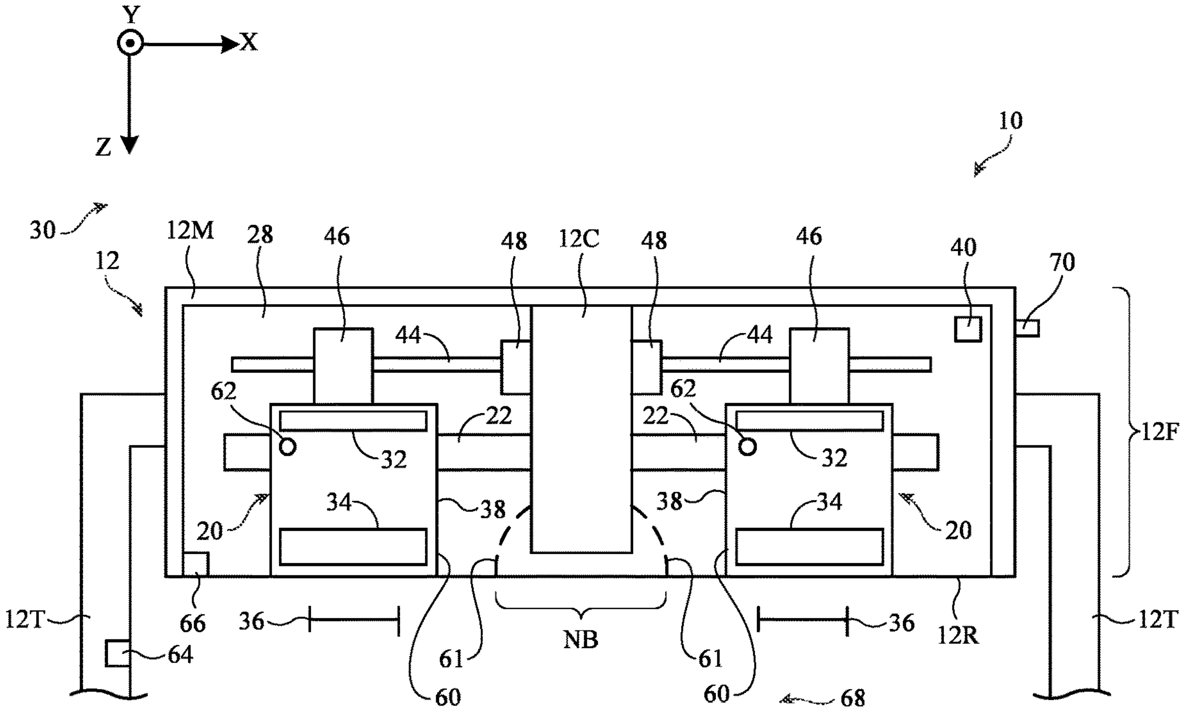
FIG. 1 is a diagram of an illustrative head-mounted device in accordance with an embodiment.

FIG. 1 is a schematic diagram of an illustrative electronic device of the type that may include movable optical assemblies to accommodate different interpupillary distances. Device 10 of FIG. 1 may be a head-mounted device (e.g., goggles, glasses, a helmet, and/or other head-mounted device). In an illustrative configuration, device 10 is a head-mounted device such as a pair of goggles (sometimes referred to as virtual reality goggles, mixed reality goggles, augmented reality glasses, etc.).

As shown in the illustrative cross-sectional top view of device 10 of FIG. 1, device 10 may have a housing such as housing 12 (sometimes referred to as a head-mounted support structure, head-mounted housing, or head-mounted support). Housing 12 may include a front portion such as front portion 12F and a rear portion such as rear portion 12R. When device 10 is worn on the head of a user, rear portion 12R rests against the face of the user and helps block stray light from reaching the eyes of the user and nose bridge portion NB of housing 12 rests on the nose of the user.

Main portion 12M of housing 12 may be attached to head strap 12T. Head strap 12T may be used to help mount main portion 12 on the head and face of a user. Main portion 12M may have a rigid shell formed from housing walls of polymer, glass, metal, and/or other materials. When housing 12 is being worn on the head of a user, the front of housing 12 may face outwardly away from the user, the rear of housing 12 (and rear portion 12R) may face towards the user. In this configuration, rear portion 12R may face the user's eyes located in eye boxes 36.

Device 10 may have electrical and optical components that are used in displaying images to eye boxes 36 when device 10 is being worn. These components may include left and right optical assemblies 20 (sometimes referred to as optical modules). Each optical assembly 20 may have an optical assembly support 38 (sometimes referred to as a lens barrel, optical module support, or support structure) and guide rails 22 along which optical assemblies 20 may slide to adjust optical-assembly-to-optical-assembly separation to accommodate different user interpupillary distances.

Each assembly 20 may have a display 32 that has an array of pixels for displaying images and a lens 34. Lens 34 may optionally have a removable vision correction lens for correcting user vision defects (e.g., refractive errors such as nearsightedness, farsightedness, and/or astigmatism). In each assembly 20, display 32 and lens 34 may be coupled to and supported by support 38. During operation, images displayed by displays 32 may be presented to eye boxes 36 through lenses 34 for viewing by the user.

Rear portion 12R may include flexible structures (e.g., a flexible polymer layer, a flexible fabric layer, etc.) so that portion 12R can stretch to accommodate movement of supports 38 toward and away from each other to accommodate different user interpupillary distances.

The walls of housing 12 may separate interior region 28 within device 10 from exterior region 30 surrounding device 10. In interior region 28, optical assemblies 20 may be mounted on guide rails 22. Guide rails 22 may be attached to central housing portion 12C. If desired, the outer ends of guide rails 22 may be unsupported (e.g., the outer end portions of rails 22 may not directly contact housing 12, so that these ends float in interior region 28 with respect to housing 12).

Device 10 may include control circuitry and other components such as components 40. The control circuitry may include storage, processing circuitry formed from one or more microprocessors and/or other circuits. To support communications between device 10 and external equipment, the control circuitry may include wireless communications circuitry. Components 40 may include sensors such as force sensors (e.g., strain gauges, capacitive force sensors, resistive force sensors, etc.), audio sensors such as microphones, touch and/or proximity sensors such as capacitive sensors, optical sensors such as optical sensors that emit and detect light, ultrasonic sensors, and/or other touch sensors and/or proximity sensors, monochromatic and color ambient light sensors, image sensors, sensors for detecting position, orientation, and/or motion (e.g., accelerometers, magnetic sensors such as compass sensors, gyroscopes, and/or sensors such as inertial measurement units that contain some or all of these sensors), radio-frequency sensors, depth sensors (e.g., structured light sensors and/or depth sensors based on stereo imaging devices), optical sensors such as self-mixing sensors and light detection and ranging (lidar) sensors that gather time-of-flight measurements, humidity sensors, moisture sensors, visual inertial odometry sensors, current sensors, voltage sensors, and/or other sensors. In some arrangements, devices 10 may use sensors to gather user input (e.g., button press input, touch input, etc.). Sensors may also be used in gathering environmental motion (e.g., device motion measurements, temperature measurements, ambient light readings, etc.).

Optical assemblies 20 may have gaze trackers 62 (sometimes referred to as gaze tracker sensors). Gaze trackers 62, which may operate through lenses 34, may include one or more light sources such as infrared light-emitting diodes that emit infrared light to illuminate the eyes of a user in eye boxes 36. Gaze trackers 62 also include infrared cameras for capturing images of the user's eyes and measuring reflections (glints) of infrared light from each of the infrared light sources. By processing these eye images, gaze trackers 62 may track the user's eyes and determine the point-of-gaze of the user. Gaze trackers 62 may also measure the locations of the user's eyes (e.g., the user's eye relief and the user's interpupillary distance).

To accommodate users with different interpupillary distances (eye-to-eye spacings), the spacing between the left and right optical assemblies 20 in device 10 can be adjusted (e.g., to match or nearly match the user's measured interpupillary distance). Device 10 may have left and right actuators (e.g., motors) such as motors 48. Each motor 48 may be used to rotate an elongated threaded shaft (screw) such as shaft 44. A nut 46 is provided on each shaft 44. The nut has threads that engage the threads on that shaft 44. When a shaft is rotated, the nut on the shaft is driven in the +X or −X direction (in accordance with whether the shaft is being rotated clockwise or counterclockwise). In turn, this moves the optical assembly 20 that is attached to the nut in the +X or −X direction along its optical assembly guide rail 22. Each assembly 20 (e.g., support 38) may have portions that receive one of guide rails 22 so that the assembly is guided along the guide rail. By controlling the activity of motors 48, the spacing between the left and right optical assemblies of device 10 can be adjusted to accommodate the interpupillary distance of different users. For example, if a user has closely spaced eyes, assemblies 20 may be moved inwardly (towards each other and towards nose bridge portion NB of housing 12) and if a user has widely spaced eyes, assemblies 20 may be moved outwardly (away from each other).

When device 10 is being worn by a user, the user's head is located in region 68. The presence of the user's head (and therefore a determination of whether device 10 is being worn or is unworn) may be made using one or more sensors (e.g., gaze trackers 62, which may detect the presence of the eyes of the user in eye boxes 36, rear-facing sensors such as sensor 66 on main housing 12M, head-facing sensors mounted on strap 12T such as sensor 64, and/or other head presence sensors). These sensors may include cameras, light sensors (e.g., visible light or infrared sensors that measure when ambient light levels have dropped due to shadowing by the head of a user), proximity sensors (e.g., sensors that emit light such as infrared light and that measure corresponding reflected light from a user's head with an infrared light sensor, capacitive proximity sensors, ultrasonic acoustic proximity sensors, etc.), switches and/or other force-sensing sensors that detect head pressure when a user's head is present, and/or other head presence sensors.

When device 10 is being worn and a user's head is present in region 68, the nose of the user will be present under nose bridge portion NB of housing 12. When optical assemblies 20 are moved towards each other so that assemblies 20 are spaced apart by an amount that matches or nearly matches the user's interpupillary distance, inner side surfaces 60 of support structures 38 in assemblies 20 will move toward opposing outer side surfaces 61 of the user's nose. With sufficient inward movement of assemblies 20, surfaces 60 may contact and press against nose surfaces 61. As a result, an outward force on assemblies 20 is created by nose surfaces 61. To avoid discomfort that might arise if the user's nose is pressed against by more than a desired amount, device 10 may be provided with features to limit inward nose pressure (e.g., to limit inward force by assemblies 20).

With an illustrative embodiment, whenever device 10 is mounted on the head of a user, motors 48 may only be permitted to move optical assemblies 20 away from each other and not towards each other. This ensures that surfaces 60 will never move towards each other while the user's nose is present, so that the user's nose will never be pressed excessively by moving surfaces 60.

Figure 2:
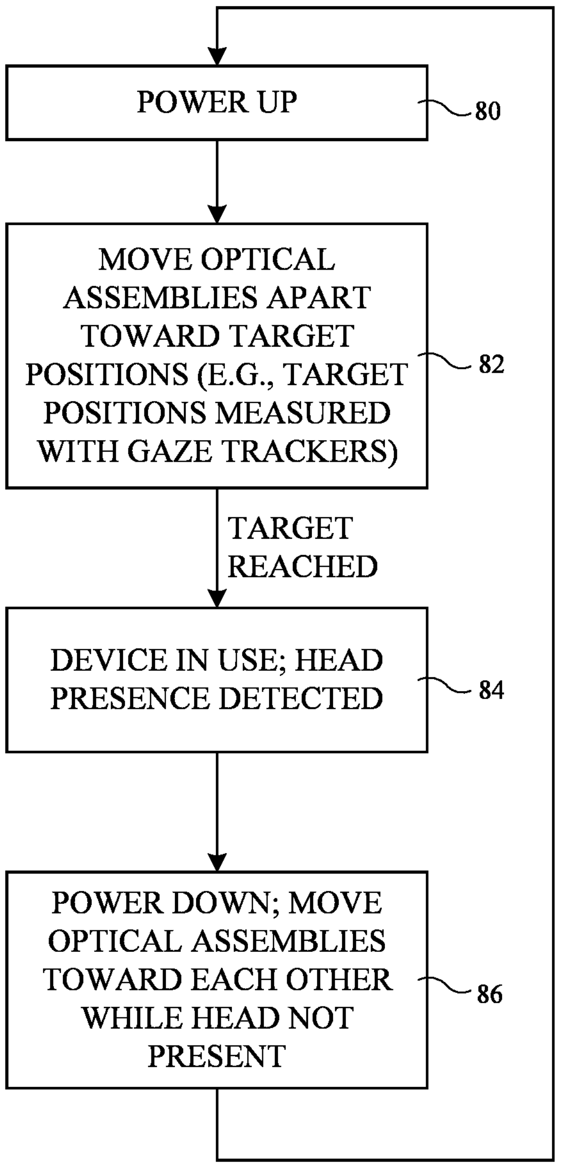
FIGS. 2 and 3 are flow charts of illustrative operations involved in using a head-mounted device with movable optical assemblies in accordance with embodiments.

The operation of device 10 in this type of arrangement is illustrated in the flow chart of FIG. 2.

During the operations of block 80, device 10 may be powered up. Device 10 may, for example, be powered up in response to detection of a user button press on button 70. During power up operations, a power supply supplies power (e.g., a power supply voltage) to the control circuits, sensors, displays, and other components 40 of device 10.

During the operations of block 82, motors 48, in response to detection of the power-up condition (e.g., in response to detecting the presence of the power supply voltage), may move optical assemblies 20 away from each other. Gaze trackers 62 may, in response to detection of the power up condition (e.g., in response to the power supply voltage), capture images of the user's eyes in eye boxes 36 and may use this information in determining a target separation between optical assemblies 20 (e.g., gaze trackers 62 may measure the user's interpupillary distance and/or other eye characteristics such as the user's eye relief and may use the user's measured interpupillary distance and/or other eye characteristics in establishing a target separation for optical assemblies 20). During the operations of block 82, motors 48 may move optical assemblies 20 apart until the target separation (target positions) for optical assemblies 20 is reached.

During the operations of block 84, after motors 48 have placed optical assemblies 20 into their desired positions, further movement of assemblies 20 may be halted and device 10 may be used to present images to eye boxes 36 for viewing by the user.

After the user has finished viewing content with device 10, device 10 may be powered down for storage. In an illustrative scenario, a button press on button 70 or other input is used to instruct device 10 to shut down. Optical assemblies 20 may be maintained in their current position while device 10 is powered down or can be moved towards each other in preparation for subsequent outward movements (see, e.g., block 82). When moving optical assemblies 20 towards each other (at block 86 or another time such as during initial power up operations), a head-presence sensor may be used to detect whether the user's head is present in region 68. The head-presence sensor may, as an example, be used to confirm that the user's head is not present whenever optical assemblies 82 are being moved towards each other. For example, during the operations of block 86, motors 48 may move optical assemblies 20 towards each other in response to the detected user power down command (e.g., the button press input on button 70) provided that no head is being detected by the head-presence sensor.

Figure 3:
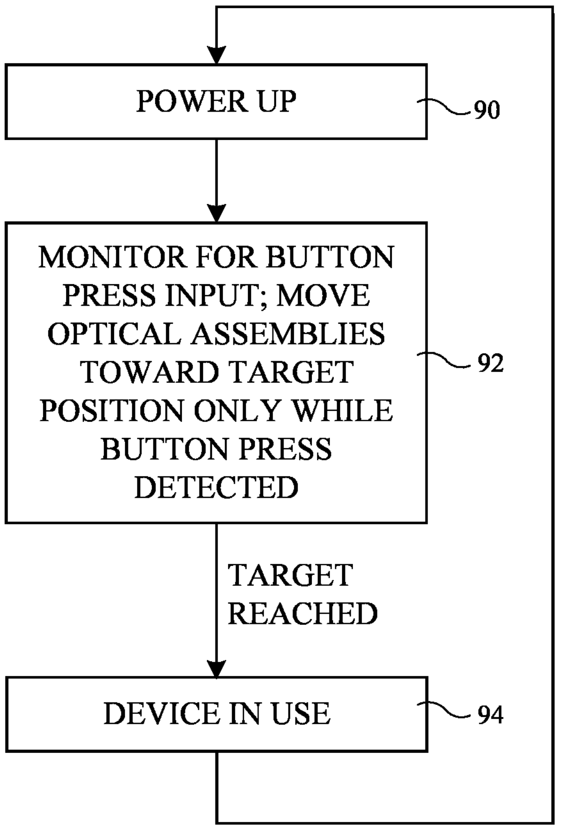

With another illustrative embodiment, which is illustrated in the flow chart of FIG. 3, motors 48 may be configured to only move optical assemblies toward each other when a user actively permits movement of optical assemblies 20. As an example, a user input device such as button 70 may be mounted on housing 12 (e.g., on an external surface of housing 12M or other external surface of housing 12). Motors 48 may be configured to inhibit movement of assemblies 20 (e.g., motors 48 may remain stationary) whenever button 70 is not being pressed. In response to detecting the pressing and continual holding of button 70 by a user, motors 48 may move optical assemblies 20 to adjust the spacing between assemblies 20. Motors 48 may, for example, move optical assemblies 20 from an initial configuration in which optical assemblies 20 are spaced apart by their maximum spacing or other wide spacing to a target configuration in which optical assemblies 20 are separated by a distance equal to or nearly equal to the measured interpupillary distance associated with the user's eyes (e.g., assemblies 20 may be moved toward their target positions as measured by gaze trackers 62).

As shown in FIG. 3, device 10 may be powered up during the operations of block 90. Following power-up operations, when device 10 is being worn on the head of the user, gaze trackers 62 may optionally measure the user's interpupillary distance and/or other eye characteristics of the user's eyes. These measurements may establish a desired separation (e.g., target positions) for optical assemblies 20.

During the operations of block 92, a user has an opportunity to press button 70. When no button press input is detected, motors 48 remain stationary, so that optical assemblies 20 do not move. When button press input is detected, motors 48 are allowed to move to adjust the separation between assemblies 20. As an example, motors 48 may move assemblies 20 inwardly towards their target positions. During movement of assemblies 20, motors 48 may be halted in response to any detected user release of button 70. In this way, the positions of assemblies 20 will be adjusted so long as button 70 is being pressed, but will stop in response to release of button 70 (e.g., when the user desires to prevent movement of assemblies 20 that could press against nose surfaces 62). The user in this scenario remains in continuous control of assemblies 20.

Once the desired positions of assemblies 20 have been reached, device 10 may be used to view images while being worn by the user. Motors 48 may stop automatically when the target positions measured by gaze trackers 62 are reached or motors 48 may stop when the user releases button 70. If desired, the direction of movement of assemblies 20 may be controlled by providing device 10 with two of buttons 70 (e.g., an inward movement button and an outward movement button) or by providing a first button 70 to control movement (e.g., a go/stop button) and a second button (e.g., a slider with two positions) that is used to choose between inward and outward movement settings. Arrangements in which device 10 has non-button user input devices such as microphones for gather voice commands, touch screen displays, and/or other user input devices may also be used in controlling movement of motors 48.

Clutches may be used to limit the amount of inward force that is applied by optical assemblies 20 when assemblies 20 are moved towards nose surfaces 61 by motors 48.

Figure 4:
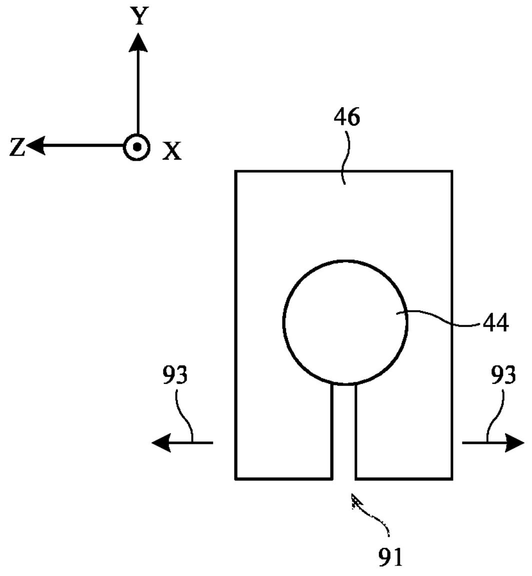
FIG. 4 is a cross-sectional end view of an illustrative clutch based on a split nut may be used in limiting how much force is applied to an optical assembly in accordance with an embodiment.

In the example of FIG. 4, a split nut arrangement is used for nut 46, forming a mechanical clutch (sometimes referred to as a force limiter). As shown in FIG. 4, nut 46 may be moved (parallel to the X axis) by rotating threaded shaft 44. Nut 46 may have a split such as split 91. When excess force is experienced (e.g., when assembly 20 starts to press against nose surface 61), nut 46 will be forced apart in directions 93 and will slide over the threads on shaft 44 rather than being driven inwardly by the interaction between the threads on shaft 44 and the corresponding threads in nut 46. In this way, excess force is released and the clutch provided by split 91 helps prevent more than a desired amount of force from being applied to the user's nose. The split nut configuration of FIG. 4 therefore serves as a release mechanism that limits pressure from assembly 20 on nose surface 61.

Figure 5:
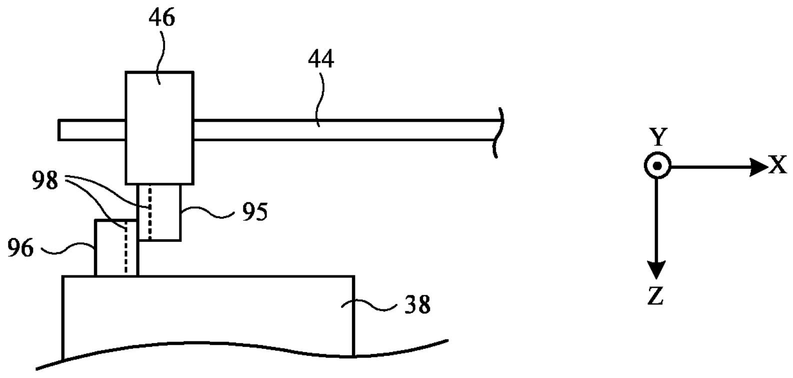
FIGS. 5 and 6 are diagrams showing how magnetic clutches may be used in limiting the force applied to optical assemblies in accordance with embodiments.
Figure 6:
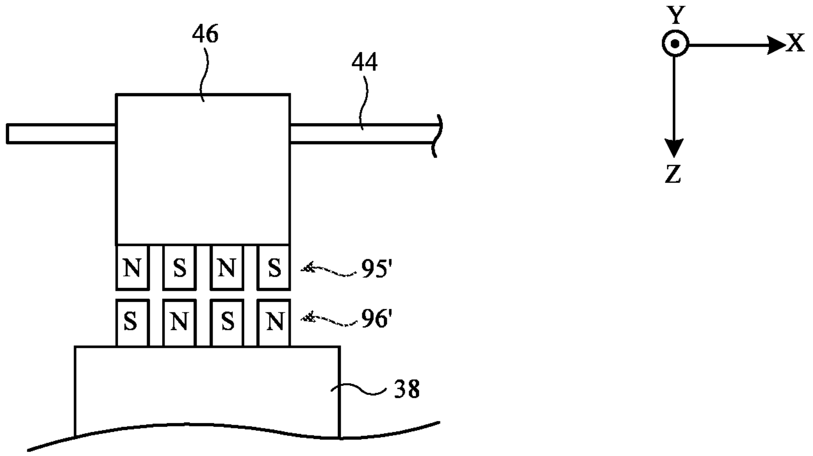

Illustrative magnetic clutches are shown in FIGS. 5 and 6. In the magnetic clutch arrangement of FIG. 5, a magnet 95 is attached to nut 46 and a magnet 96, which is attracted to magnet 95, is attached to support 38. Optional structures 98 (e.g., non-magnetic coatings and/or protruding structures that establish an air gap between magnets 95 and 96) may be used to adjust the holding force established by the attraction between magnets 95 and 96. During normal operations, magnets 95 and 96 are magnetically coupled to each other, so that optical assembly support 38 is moved back and forth along the length of shaft 44 (e.g., parallel to the X axis in the example of FIG. 5), thereby adjusting the spacing between assemblies 20. If, however, inward movement of assemblies 20 is resisted due to contact between surfaces 60 and nose surfaces 61, the holding force of the magnetic clutch will be exceeded, magnets 95 and 96 will separate, and this decoupling of magnets 95 and 96 will prevent further inward movement of assemblies 20.

In the example of FIG. 6, two rows of magnets are provided that are configured so that their exposed poles oppose each other. With this type of arrangement, the poles of magnets 95' attract the poles of magnets 96', so that during normal operations, nut 46 is magnetically coupled to support 38 and is able to move support 38 and thereby adjust the position of the optical assembly associated with support 38. In the event that surface 60 of support 38 presses against nose surface 61, the magnetic holding ability of the magnetic clutch of FIG. 6 will be exceeded, magnets 95' and 96' will decouple and will slide past each other, and additional inward movement of assemblies 20 towards the nose of the user will be prevented.

Figure 7:
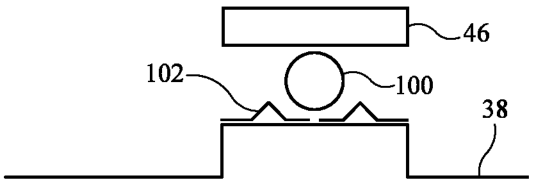
FIGS. 7, 8, 9, and 10 are diagrams of illustrative mechanical clutch mechanisms that may be used in moving optical assemblies in accordance with embodiments.

FIG. 7 is a diagram showing how interlocking physical features may be used to implement a mechanical version of the magnetic clutch of FIG. 6. In the example of FIG. 7, pin 100 is coupled to nut 46 and protrusions 102 (sometimes referred to as snap features, locking structures, or a releasable pin lock), which are coupled to support 38. During normal operations, pin 100 will not bend and will transfer force along the X direction from nut 46 to support 38 to move assembly 20. If excess force is generated (e.g., when assembly 20 contacts nose surface 61), pin 100 will bend and slip past protrusions 102 in the pin lock, thereby decoupling nut 46 from support 38 and preventing further movement of assemblies 20 towards the user's nose.

Figure 8:
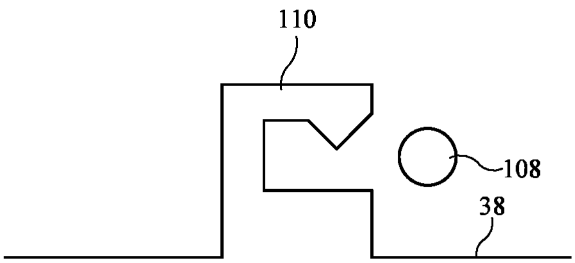
Figure 9:
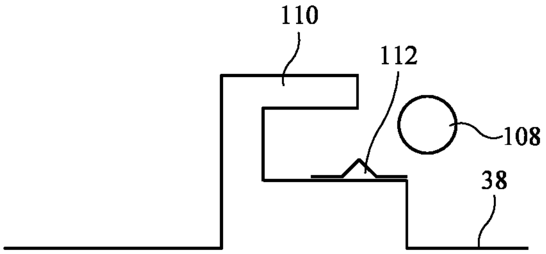
Figure 10:
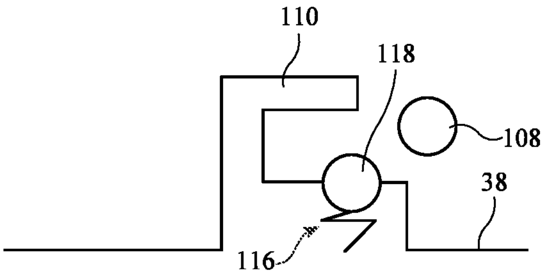

FIGS. 8, 9, and 10 show illustrative mechanical clutch designs that may be used to implement mechanical version of the magnetic clutch of FIG. 5. In the arrangement of FIG. 8, pin 108 is coupled to nut 46 and interlocks with a releasable pin lock formed from snap 110 on support 38. When excess force is applied, snap 110 deforms and pin 108 escapes from snap 110 to release the clutch. In the arrangement of FIG. 9, the downward protrusion of snap 110 of FIG. 8 has been replaced with protrusion 112 to form a releasable pin lock. In the example of FIG. 10, a releasable pin lock is formed from spring 114 and movable ball 116 instead of protrusion 112 of FIG. 9.

Figure 11:
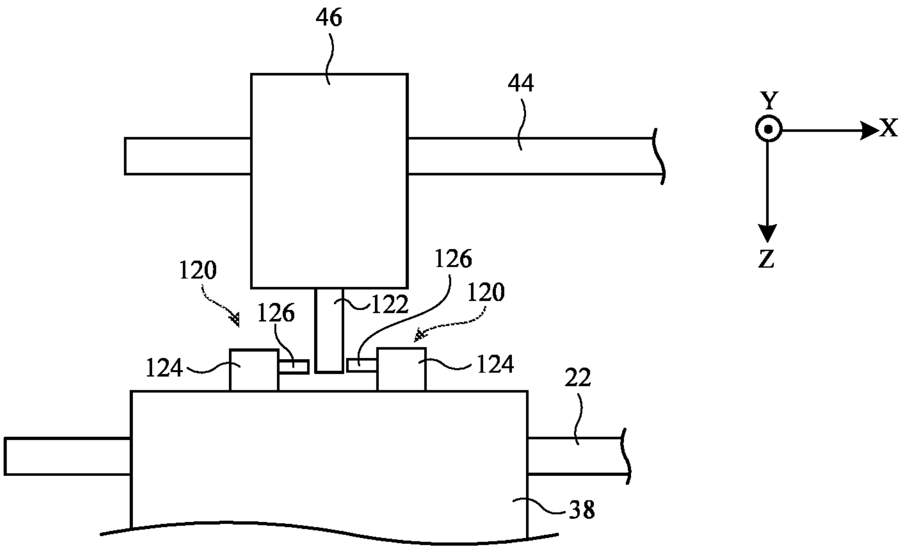
FIG. 11 is a diagram showing how force-sensitive switches may be used in coupling a nut to an optical assembly in accordance with an embodiment.

As shown in FIG. 11, force-sensitive components (sometimes referred to as switches or force sensors) may be used in detecting when more than a desired amount of force is being applied by nut 46 to support 38. Motors 48 are configured to deactivate in response to detecting this high amount of force (e.g., a force exceeding a predetermined threshold), thereby preventing excess nose pressure from assemblies 20. In the illustrative arrangement of FIG. 11, a protruding structure such as pin 122 is attached to nut 46. Pin 122 extends between first and second switches 120 (or other force sensors such as strain gauges, etc.). Each switch 120 in the example of FIG. 11 has a stationary switch body 124 within which a movable plunger 126 is mounted. As nut 46 is moved back and forth along the X axis by rotation of shaft 44 from motors 48, pin 122 pushes against plungers 126 (e.g., the plunger in the right-hand switch 120 when pushing support 38 to the right and the plunger in the left-hand switch 120 when pushing support 38 to the left). Plungers 126 are not pressed significantly into bodies 124 so long as a threshold amount of force on the plungers 126 is not exceeded. The interaction between pin 122 and switches 120 therefore allows lateral force to be transferred from nut 46 to support 38 to slide support 38 along rails 22 parallel to the X axis. If, however, assembly 20 contacts nose surface 61, support 38 will resist further movement and pin 122 will push against the plunger 126 that is in contact with pin 122 with more than the threshold amount of force. In response to detecting a change in the state of switch 120 due to this elevated force, motors 48 are e halted, thereby preventing more than a desired amount of force from being applied to nose surface 61.

Figure 12:
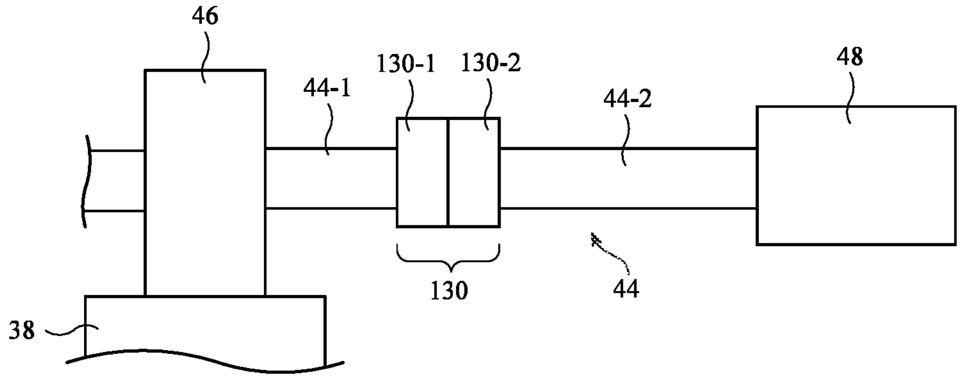
FIG. 12 is a diagram showing how torque-sensitive switches may be coupled between a rotating motor and a portion of a rotating shaft in accordance with an embodiment.

In the example of FIG. 12, a torque-sensitive switch mechanism (switch 130, sometimes referred to as a torque sensor or torque-sensitive switch) is used to couple rotating shaft portion 44-2 of shaft 44 to rotating shaft portion 44-1 of shaft 44. Nut 46 may be coupled to portion 44-1 and may be used to move support 38 parallel to shaft 44. Motor 48 may rotate shaft portion 44-2 to move nut 46. Switch 130 may have a first switch portion 130-1 and a second switch portion 130-2. When less than a threshold amount of torque is applied to portion 130-2 by shaft portion 44-2, portion 130-2 transfers this applied torque to portion 130-1, which, in turn, transfers this applied torque to portion 44-1. The rotation of portion 44-1 moves nut 46 laterally to adjust the lateral position of support 38 and assembly 20. In the event that support 38 contacts nose surface 61, support 38 will resist further lateral motion by nut 46. This will create a rise in torque that is detected by switch 130. In response, motor 48 halts its motion. By stopping motors 48 in response to detecting an amount of torque exceeding a predetermined torque threshold, motors 48 can be prevented from applying more force than desired to nose surfaces 61.

Figure 13:
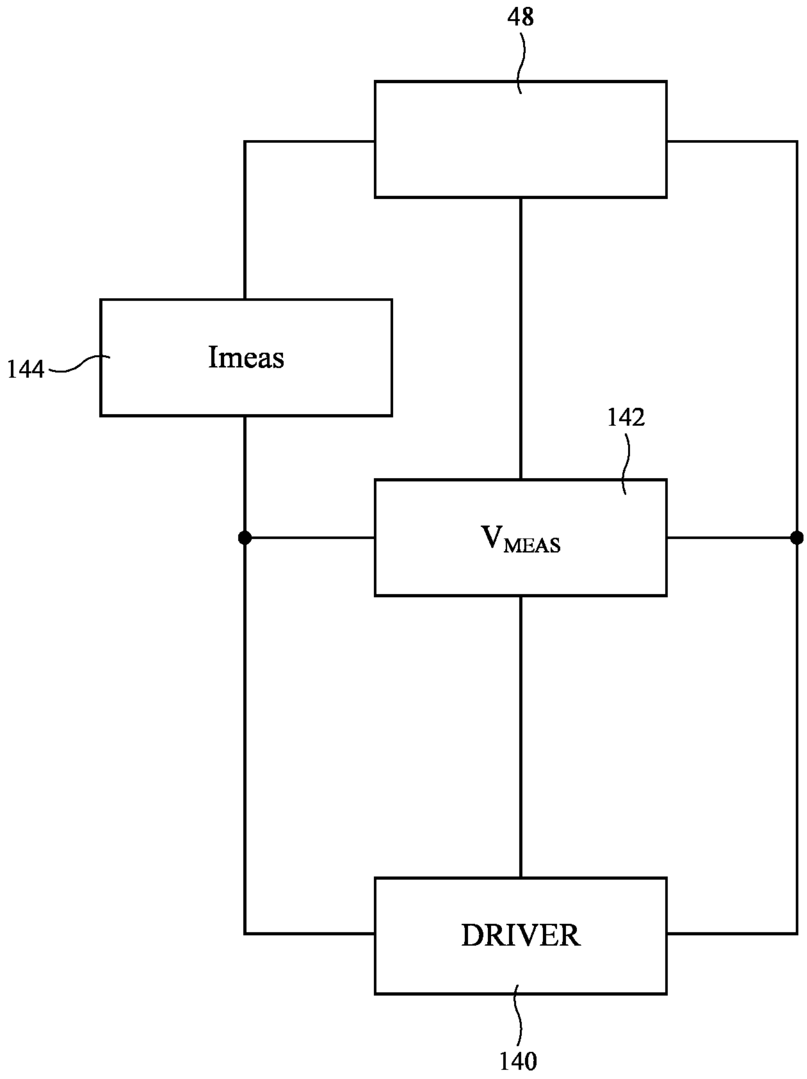
FIG. 13 is a circuit diagram showing how motor load may be measured electrically while moving optical assemblies in accordance with an embodiment.

If desired, the load on motors 48 can be monitored electronically, so that motors 48 can be halted if more than a desired motor load is encountered. An illustrative motor control circuit is shown in FIG. 13. As shown in FIG. 13, motor 48 may be driven using a drive circuit such as driver 140. Driver 140 may apply any suitable drive signal to motor 48 (e.g., a sinusoidal motor drive current, etc.). Current sensor 144 may measure the current Imeas that flows through motor 48. Voltage sensor 142 may measure the voltage Vmeas across the terminals of motor 48. The counterelectromotive force ("back EMF") that is produced when operating motor 48 is equal to (Imeas*Rm−Vmeas), where Rm is the known motor resistance associated with motor 48. During operation of motor 48, back EMF may be calculated in real time and the phase difference between Imeas and the back EMF may be monitored to determine the motor load being experienced by motor 48 (e.g., motor 48 may be determined to be unloaded when the measured phase difference is 90°, may be determined to be fully loaded when the measured phase difference is 0°, and may be determined to be experiencing an intermediate amount of load when the measured phase difference is between 0° and 90°). Motors 48 may be configured to halt operation in response to a determination that the motor load has exceeded a desired amount (e.g., a determination that the measured phase difference between Imeas and back EMF is less than a predetermined threshold phase shift value such as less than 85° or less than 40°).

Figure 14:
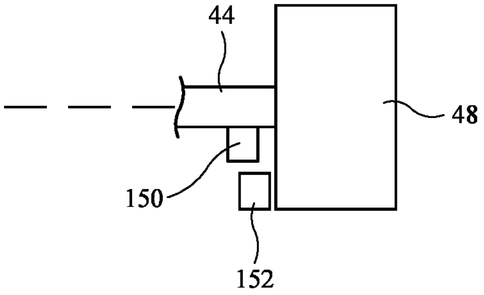
FIG. 14 is a diagram of an illustrative motor with a rotary encoder in accordance with an embodiment

If desired, motor 48 may be supplied with a rotatory encoder, as shown in the example of FIG. 14. In this example, magnet 150 is attached to shaft 44 and magnetic sensor 152 is used to monitor the magnetic field produced by magnet 150. Sensor 152 and magnet 152 therefore serve as an encoder that measures the rotation of shaft 44 and therefore the rotation of the rotor in motor 48. With this arrangement, the phase shift between the angle of the rotor and the drive current (e.g., Imeas) may be used as a measure of motor load or (in an arrangement in which motor 48 is being controlled by establishing a phase of 0° between rotor angle and drive current) motor load may be determined by monitoring Imeas and comparing Imeas to a threshold (as examples). When motor load is not elevated (e.g., below a predetermined threshold), motors 48 may rotate normally to move nut 46 along shaft 44 and thereby move optical assemblies 20. When optical assemblies 20 contact nose surfaces 61, motor load will increase beyond a threshold amount. In response, motors 48 may be halted, thereby preventing excess pressure on nose surfaces 61.

Figure 15:
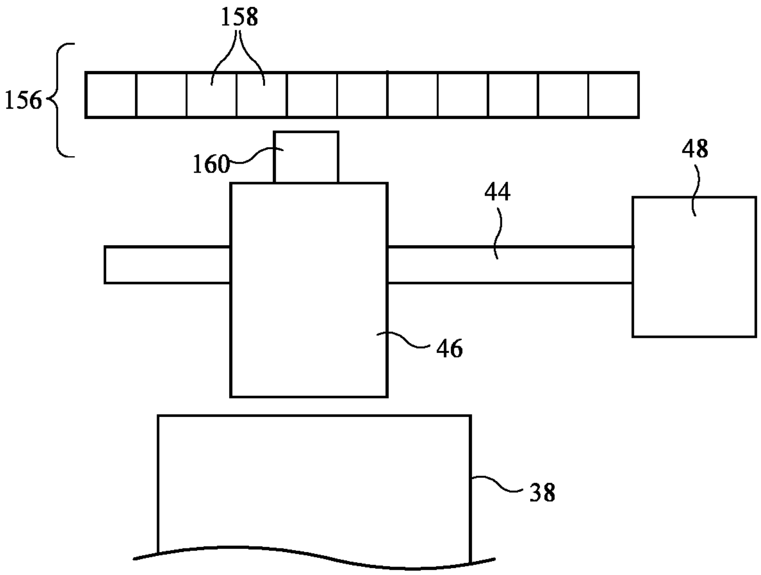
FIG. 15 is a diagram of an illustrative motor, movable optical assembly, and associated linear magnetic encoder in accordance with an embodiment.

Another illustrative technique for electronically monitoring motor load involves the use of a linear encoder of the type shown in FIG. 15. As shown in FIG. 15, encoder 156 may include a strip of magnets 158 and a corresponding magnetic sensor 160. Sensor 160 may be attached to nut 46. Magnets 158 may be attached to a stationary support surface (e.g., a portion of housing 12). When motor 48 rotates shaft 44, nut 46 is moved parallel to shaft 44. This causes sensor 160 to move past magnets 158 while measuring the magnetic fields from magnets 158. By monitoring the measured changes in magnetic field strength due to movement of sensor 160 past magnets 158, motors 48 can determine the speed of nut 46 and can determine when nut 46 has stopped and motors 48 have stalled (e.g., when applied current to motors 48 is failing to cause lateral motion in nuts 46).

Figure 16:
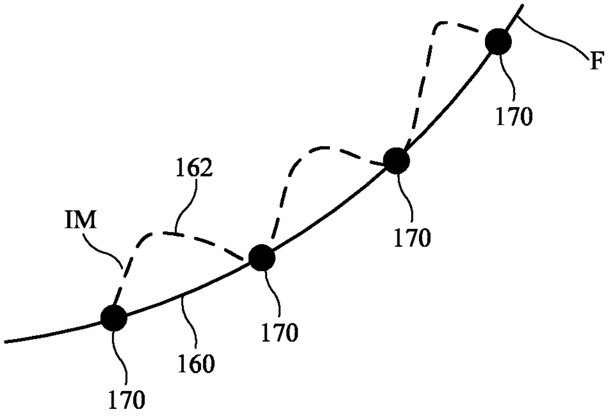
FIG. 16 is a graph showing how motor stalling may be detected while controlling a motor to move an optical assembly in accordance with an embodiment.

The graph of FIG. 16 illustrates how stall detection may be used in measuring the force experienced by assemblies 20 when motors 48 contact nose surfaces 61. Solid line 160 represent an increasing amount of force F of the type that may be experienced by optical assemblies 20 (e.g., support 38 and nut 46) as optical assemblies 20 come into contact with nose surfaces 61 and begin to feel resistance (back pressure) from nose surfaces 61. Current Im may be applied to motors 48 by driver 140 (FIG. 13) in a pattern that follows dashed line 162, which represents the amount of resulting motor force produced by current Im.

In the example of FIG. 16, motor 48 periodically stalls at stall points 170. This is because the amount of forward force produced by the current Im applied to the motor is equaled by the back pressure (reverse force F) produced as nose surface 61 resists further forward motion by optical assembly 20. By using an encoder such as encoder 156 of FIG. 15, the motion of nut 46 and therefore the movement of support 38 and optical assembly 20 can be monitored. Whenever no motion is detected in response to a particular value of applied current Im, it can be concluded that optical assembly 20 has halted (e.g., motor 48 has stalled at one of stall points 170). Motor 48 may be a stepper motor that is controlled by application of sets of pulses (e.g., 10 pulses at a time). Following detection of a stall (e.g., when it is detected that motor 48 moved assembly 20 less than expected after a given set of current pulses was applied), the magnitude of applied current Im may, as shown in FIG. 16, initially increase (to ensure further movement) and then decrease until the force being produced by motor 48 matches the reverse force due to nose surface contact. Each time a stall point 170 is reached in this way, the amount of current Im may be evaluated. With this approach, the magnitude of the current applied to motor 48 closely tracks the increase in force F due to nose contact so that the magnitude of the current can be used as a measure of pressure on nose surface 61. Motors 48 may be configured to halt (e.g., no more current will be applied) in response to the value of Im exceeding a predetermined threshold value.

Figure 17:
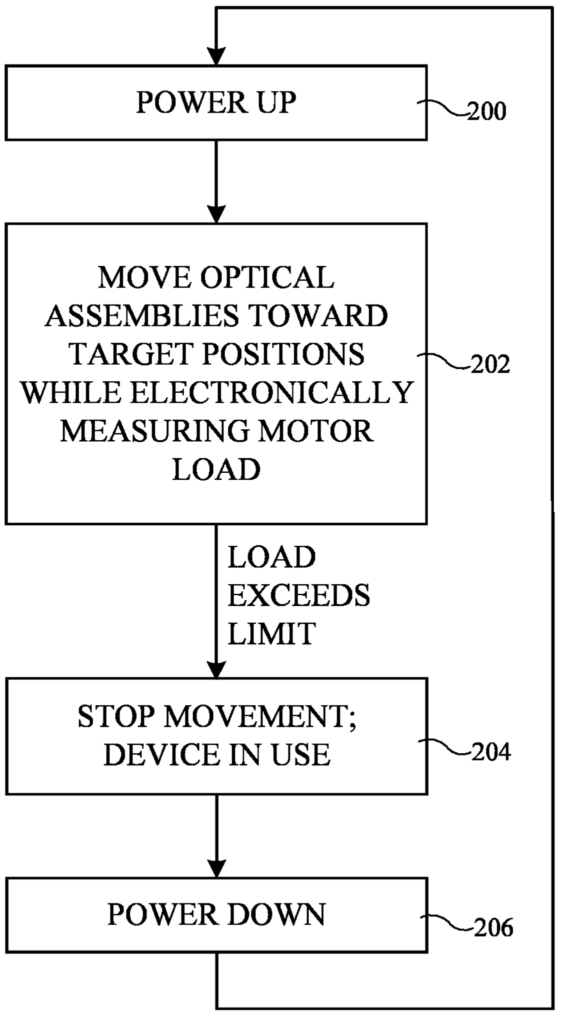
FIG. 17 is a flow chart of illustrative operations involved in using a head-mounted device with motors to move optical assemblies in accordance with an embodiment.

The flow chart of FIG. 17 shows illustrative operations that may be involved in operating device 10 in an arrangement in which electrical monitoring of motor load is used to determine when to halt motor operation and thereby prevent more than a desired amount of force being applied by optical assemblies 20 on nose surfaces 61.

During the operations of block 200, device 10 may be powered up (e.g., in response to a detected button press or other activity).

Once device 10 has powered up, gaze trackers 62 may measure the separation between the user's eyes (user interpupillary distance) and other eye characteristics to determine target positions for optical assemblies 20. Motors 48 may then rotate shafts 44 to move optical assemblies 20 towards the target positions (e.g., by moving assemblies 20 towards nose bridge portion NB of housing 12). During motor operation, motor load may be electrically monitored (e.g., using back EMF measurements, using encoder output, using measurements of applied current, and/or using other measurements of the types described in connection with FIGS. 13, 14, 15, and 16).

If optical assemblies 20 contact nose surfaces 61, nose surfaces 61 will produce a force against optical assemblies 20 that tends to resist further movement. Motors 48 are configured to halt operation in response to detection of more than a desired amount of motor load (see, e.g., block 204). At this point, device 10 may be operated normally and used in presenting images to the user's eyes in eye boxes 36.

Following use of device 10, device 10 can be powered down (see, e.g., the operations of block 206). Device 10 may, as an example, be powered down in response to detection of a user button press or other activities.

To help protect the privacy of users, any personal user information that is gathered by sensors may be handled using best practices. These best practices including meeting or exceeding any privacy regulations that are applicable. Opt-in and opt-out options and/or other options may be provided that allow users to control usage of their personal data.

The foregoing is merely illustrative and various modifications can be made to the described embodiments. The foregoing embodiments may be implemented individually or in any combination.

What is claimed is:

1. A head-mounted device, comprising:
a head-mounted housing;
optical assemblies in the head-mounted housing that are configured to move towards and away from a nose bridge portion of the head-mounted housing, each optical assembly including a lens and a display configured to provide an image to an eye box through the lens;
a button;
a head-presence sensor configured to detect whether the head-mounted housing is being worn; and
motors configured to move the optical assemblies towards the nose bridge portion in response to the button being pressed and the head-presence sensor determining that the head-mounted housing is not being worn.

2. The head-mounted device defined in claim 1 wherein the motors are configured to halt motion in response to detection that the button is not being pressed.

3. The head-mounted device defined in claim 2 further comprising gaze trackers configured to measure user eye characteristics used in determining target positions for the optical assemblies.

4. The head-mounted device defined in claim 3 wherein the motors are configured to move the optical assemblies towards the target positions in response to determining that the button is being pressed.

5. The head-mounted device defined in claim 1 wherein the motors are configured to move the optical assemblies towards the nose bridge portion with a force, the head-mounted device further comprising:

a clutch for each motor that is configured to limit the force towards the nose bridge portion.

6. The head-mounted device defined in claim 5 further comprising:

threaded shafts rotated by the motors; and nuts moved by rotation of the threaded shafts, each nut being coupled to a respective one of the optical assemblies.

7. The head-mounted device defined in claim 6 wherein the nuts comprise split nuts, each split nut serving as one of the clutches and being configured to slide over threads on a respective one of the threaded shafts to limit the force.

8. The head-mounted device defined in claim 6 wherein each clutch comprises a magnetic clutch.

9. The head-mounted device defined in claim 8 wherein each magnetic clutch has a magnet coupled to a respective one of the nuts.

10. The head-mounted device defined in claim 9 wherein each magnetic clutch has an additional magnet coupled to one of the optical assemblies, wherein the magnet and the additional magnet of each magnetic clutch are configured to break apart to limit the force.

11. The head-mounted device defined in claim 8 wherein each magnetic clutch has first and second rows of magnets that are configured to slide past each other to limit the force.

12. The head-mounted device defined in claim 5 wherein each clutch has a pin and a corresponding releasable pin lock configured to decouple to limit the force.

13. A head-mounted device, comprising:

a head-mounted housing;

optical assemblies in the head-mounted housing that are configured to move towards and away from a nose bridge portion of the head-mounted housing, each optical assembly including a lens and a display configured to provide an image to an eye box through the lens;

a button;

a head-presence sensor configured to detect whether the head-mounted housing is not being worn;

motors configured to move the optical assemblies towards the nose bridge portion with a force in response to the button receiving user input; and a clutch for each motor that is configured to limit the force towards the nose bridge portion.

14. The head-mounted device defined in claim 13 wherein each clutch comprises a magnetic clutch.

15. The head-mounted device defined in claim 14 further comprising:

threaded shafts rotated by the motors; and nuts moved by rotation of the threaded shafts, each nut being coupled to a respective one of the optical assemblies.

16. The head-mounted device defined in claim 15 wherein each magnetic clutch has a magnet coupled to a respective one of the nuts and an additional magnet coupled to one of the optical assemblies, wherein the magnets and the additional magnets are configured to break apart to limit the force.

17. The head-mounted device defined in claim 14 wherein each magnetic clutch has first and second rows of magnets that are configured to slide past each other to limit the force.

18. The head-mounted device defined in claim 13 wherein each clutch has a pin and a corresponding releasable pin lock configured to decouple to limit the force.

19. A head-mounted device, comprising:

a head-mounted housing;

optical assemblies in the head-mounted housing that are configured to move towards and away from a nose bridge portion of the head-mounted housing, each optical assembly including a lens and a display configured to provide an image to an eye box through the lens;

a button;

a head-presence sensor configured to detect whether the head-mounted housing is being worn;

motors configured to move the optical assemblies towards the nose bridge portion with a force in response to the button being pressed and the head-presence sensor determining that the head-mounted housing is not being worn; and a force-limiting mechanism coupled to each motor, wherein the force-limiting mechanism is configured to limit the force towards the nose bridge portion.

20. The head-mounted device defined in claim 19 wherein the force-limiting mechanism comprises a clutch.

* * * * *